United States Patent
Choi

(10) Patent No.: US 10,994,716 B2
(45) Date of Patent: May 4, 2021

(54) ELECTRIC PARKING BRAKE DEVICE

(71) Applicant: HYUNDAI MOBIS CO., LTD., Seoul (KR)

(72) Inventor: Moo Jin Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 5 days.

(21) Appl. No.: 16/542,212

(22) Filed: Aug. 15, 2019

(65) Prior Publication Data

US 2020/0055505 A1 Feb. 20, 2020

(30) Foreign Application Priority Data

Aug. 17, 2018 (KR) .................. 10-2018-0096268

(51) Int. Cl.
| | | |
|---|---|---|
| *B60T 13/74* | (2006.01) | |
| *F16D 65/66* | (2006.01) | |
| *B60T 13/58* | (2006.01) | |
| *H02K 7/10* | (2006.01) | |
| *F16D 65/56* | (2006.01) | |

(52) U.S. Cl.
CPC .......... *B60T 13/588* (2013.01); *F16D 65/563* (2013.01); *H02K 7/10* (2013.01)

(58) Field of Classification Search
CPC .......... F16D 51/10; F16D 51/12; F16D 51/18; F16D 51/22; F16D 51/28; F16D 51/2125; F16D 65/08; F16D 65/22; F16D 65/183; F16D 65/565; B60T 13/588
USPC ............................ 188/79.62, 79.64, 325–341
See application file for complete search history.

(56) References Cited

U.S. PATENT DOCUMENTS

| | | | | |
|---|---|---|---|---|
| 3,744,595 | A * | 7/1973 | Adams | .................... F16D 65/46 188/79.64 |
| 3,811,538 | A * | 5/1974 | Farr | ........................ F16D 65/22 188/79.62 |
| 8,185,287 | B2 * | 5/2012 | Maron | .................... B60T 7/107 701/70 |
| 9,051,982 | B2 | 6/2015 | Park et al. | |
| 9,772,029 | B2 * | 9/2017 | Thomas | .................. F16H 57/10 |
| 10,378,603 | B2 * | 8/2019 | Choi | ........................ F16D 51/12 |
| 2010/0206677 | A1 * | 8/2010 | Shiraki | .................. B60T 13/741 188/325 |
| 2012/0031716 | A1 * | 2/2012 | Flodin | ..................... F16D 51/18 188/79.63 |
| 2013/0087422 | A1 * | 4/2013 | Park | ........................ F16D 65/22 188/325 |

(Continued)

FOREIGN PATENT DOCUMENTS

| | | |
|---|---|---|
| CN | 103661315 | 3/2014 |
| JP | 2015-203458 | 11/2015 |

(Continued)

*Primary Examiner* — Christopher P Schwartz
(74) *Attorney, Agent, or Firm* — H.C. Park & Associates, PLC

(57) ABSTRACT

An electronic parking brake device may include: a gear unit driven by an actuator; a rotating rod connected to the gear unit; a push rod unit configured to pressurize one or more shoes while moved in connection with the rotating rod; a clutch unit disposed to interfere with a moving line of the gear unit, and configured to apply a rotational load to the gear unit while abutting on the gear unit, when the gear unit is rotated at a present angle; and a controller configured to control the operation of the actuator according to the load applied to the actuator.

19 Claims, 11 Drawing Sheets

(56) References Cited

U.S. PATENT DOCUMENTS

2017/0002882 A1\* 1/2017 Gutelius ................. F16D 51/28
2018/0058525 A1\* 3/2018 Kasper ................... F16D 51/28
2019/0331183 A1 10/2019 Choi
2019/0344761 A1\* 11/2019 Cho ....................... F16D 51/22

FOREIGN PATENT DOCUMENTS

KR 10-1272497 12/2012
KR 10-2018-0042503 4/2018

\* cited by examiner

ELECTRIC PARKING BRAKE DEVICE

CROSS-REFERENCE TO RELATED APPLICATION

This application claims priority from and the benefit of Korean Application No. 10-2018-0096268, filed on Aug. 17, 2018, which is hereby incorporated by reference for all purposes as if set forth herein.

BACKGROUND

Field

Exemplary embodiments relate to an electronic parking brake device, and more particularly to an electronic parking brake device for braking a parked vehicle using an actuator.

Discussion of the Background

In general, a drum brake refers to a device that generates a braking force through friction with a drum rotating with a wheel. Specifically, the drum brake acquires a braking force by using hydraulic pressure (main braking) or rubbing a shoe having a friction material attached thereto against the drum using a cable connected to a parking brake lever (parking braking). The conventional drum brake includes the drum, a pair of shoes disposed on a back plate so as to face the inner circumferential surface of the drum and each having a friction material attached to the outer circumference thereof, and a wheel cylinder for main braking, which receives braking hydraulic pressure and moves the shoes outwards. Furthermore, an operating lever for a parking brake, installed on the drum brake, has one end axially coupled to the shoes and the other end connected to the parking brake lever installed beside a driver's seat through a cable. When a driver pulls the parking brake lever, parking braking is mechanically performed.

Between the pair of shoes, an adjuster is disposed to compensate for a gap between the drum and the friction material. The adjuster has a structure in which a male push rod, a female push rod and an adjustment nut are assembled. When the adjustment nut is rotated, the length of the adjuster is increased to compensate for the expanded gap between the friction material and the drum. In order to implement the operation of the adjuster, the operating lever for a parking brake needs to be connected to the adjuster, a lever pawl having an end engaged with the gear of the adjustment nut needs to be rotatably installed in the shoe, and a tensile spring needs to be installed between the lever pawl and the bottom of the shoe.

The related art is disclosed in Korean Patent Registration No. 1272497 registered on Jun. 3, 2013 and entitled "Adjust Assembly of Drum Brake".

In the related art, a plurality of parts such as the adjuster including the male push rod, the female push rod and the adjustment nut, the lever pawl and the tensile spring need to be provided in order to implement the adjust function for compensating for wear of the friction material. Also, an inconvenient process of assembling the plurality of parts to set positions needs to be performed in order to implement the adjust function in interconnection with moving line changes of the shoes and the operating lever for a parking brake. Furthermore, since gap compensation is performed based on the gear of the adjustment nut, the precision is inevitably low, and an operation of reducing the length of the adjuster cannot be implemented, which makes it difficult to efficiently cope with thermal expansion of the drum.

Therefore, there is a demand for a structure capable of solving the problems.

The above information disclosed in this Background section is only for enhancement of understanding of the background of the invention and, therefore, it may contain information that does not constitute prior art.

SUMMARY

Exemplary embodiments of the present invention provide an electronic parking brake device which can be manufactured with a simpler structure, implement an adjust function of constantly maintaining a gap between a drum and a friction material with more precision, and efficiently cope with thermal expansion of a drum.

Additional features of the invention will be set forth in the description which follows, and in part will be apparent from the description, or may be learned by practice of the invention.

In one embodiment, an electronic parking brake device may include: a gear unit driven by an actuator; a rotating rod connected to the gear unit; a push rod unit configured to pressurize one or more shoes while moved in connection with the rotating rod; a clutch unit disposed to interfere with a moving line of the gear unit, and configured to apply a rotational load to the gear unit while abutting on the gear unit, when the gear unit is rotated at a preset angle; and a controller configured to control the operation of the actuator according to the load applied to the actuator.

The gear unit may include: a driving gear rotated by power received from the actuator; and a driven gear engaged with the driving gear and rotated while the speed thereof is reduced.

The driven gear may include: a rod coupling part to which the rotating rod is fitted; a guide groove formed on the inner circumferential surface of the rod coupling part, and extended in the direction of a rotation axis; and a clutch connection part abutting on the clutch unit.

The rotating rod may include: a gear assembly part installed through the rod coupling part; and a screw extension part formed coaxially with the gear assembly part, and having a screw coupled to the push rod unit.

The gear assembly part may include: a central shaft having a diameter corresponding to the rod coupling part; and a guide protrusion formed on the outer surface of the gear assembly part, and slid along the guide groove in the axial direction of the driven gear.

The screw extension part may include: a first extension formed at one end of the central shaft, and having the screw formed on the outer surface thereof, the screw being coupled to the push rod unit; and a second extension formed at the other end of the central shaft, and having a contact stabilizer formed at an end thereof.

The rotating rod may further include a push extension part connected to the gear assembly part on the opposite side of the screw extension part, and configured to transfer a sliding displacement of the gear assembly part to the push rod unit.

The push rod unit may include: a moving push rod abutting on one shoe of the pair of shoes, screwed to the screw extension part, and moved along the screw extension part while interlocking with rotation of the screw extension part; and an interlocking push rod abutting on the other shoe of the pair of shoes, connected to the push extension part, and pushed and moved by the push extension part when the moving push rod is moved.

The clutch unit may include: a clutch base part disposed coaxially with the driven gear; a gear locking part formed in a protrusion shape on the clutch base part, and disposed at a preset angle with the clutch connection part of the driven gear; and a rotational load element configured to pressurize the clutch base part such that a load is applied to the driven gear while the clutch connection part is locked to the gear locking part.

The rotational load element may include: a first contact part disposed on one side of the clutch base part, and abutting on the clutch base part; a second contact part facing the first contact part, with the clutch base part provided therebetween; and an elastic pressurizing member disposed between the clutch base part and the second contact part, and elastically pressurizing the clutch base part.

The controller may drive the actuator in the forward direction when a parking brake is operated, and stop the operation of the actuator when a preset magnitude of current is applied to the actuator while the shoe pressurizes a drum.

The controller may drive the actuator in the reverse direction when the parking brake is released, and stop the operation of the actuator when a current applied to the actuator rises while a load is applied to the gear unit by the clutch unit.

In accordance with the embodiment of the present invention, when the parking brake is released, a load may be applied to the clutch unit by the gear unit rotated by the preset angle, and the controller may control the operation of the actuator according to the load, such that the gap between the shoe and the drum is constantly maintained as a distance corresponding to the preset angle. That is, the adjust function can be implemented.

Furthermore, the electronic parking brake device in accordance with the embodiment of the present invention may be manufactured with a simple structure in which the gear unit, the rotating rod, the push rod and the clutch unit are coaxially connected and fastened to one housing. Therefore, the electronic parking brake device does not need to include a plurality of parts such as an adjuster, a lever pawl and a tensile spring, the adjuster including a male push rod, a female push rod and an adjustment nut, unlike an existing device. Furthermore, the electronic parking brake device can omit an inconvenient process of assembling the parts to preset positions in order to implement the adjust function in connection with moving line changes of the shoes and the operating lever for the parking brake.

Furthermore, since the gap between the shoe and the drum is correctly maintained as a distance corresponding to the preset angle, the extension of the gap with the drum may be linearly compensated for according to the wear of the friction material, which makes it possible to prevent degradation in adjustment precision, which occurs as the gap compensation is performed on a gear basis in the existing device.

Furthermore, the electronic parking brake device in accordance with the embodiment of the present invention may not only compensated for the extension of the gap with the drum due to the wear of the friction material, but also flexibly compensate for the reduction of the gap with the drum, which makes it possible to solve the problem of the existing device that could not efficiently cope with thermal expansion of the drum because the existing device could not implement an operation of reducing the length of the adjuster.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
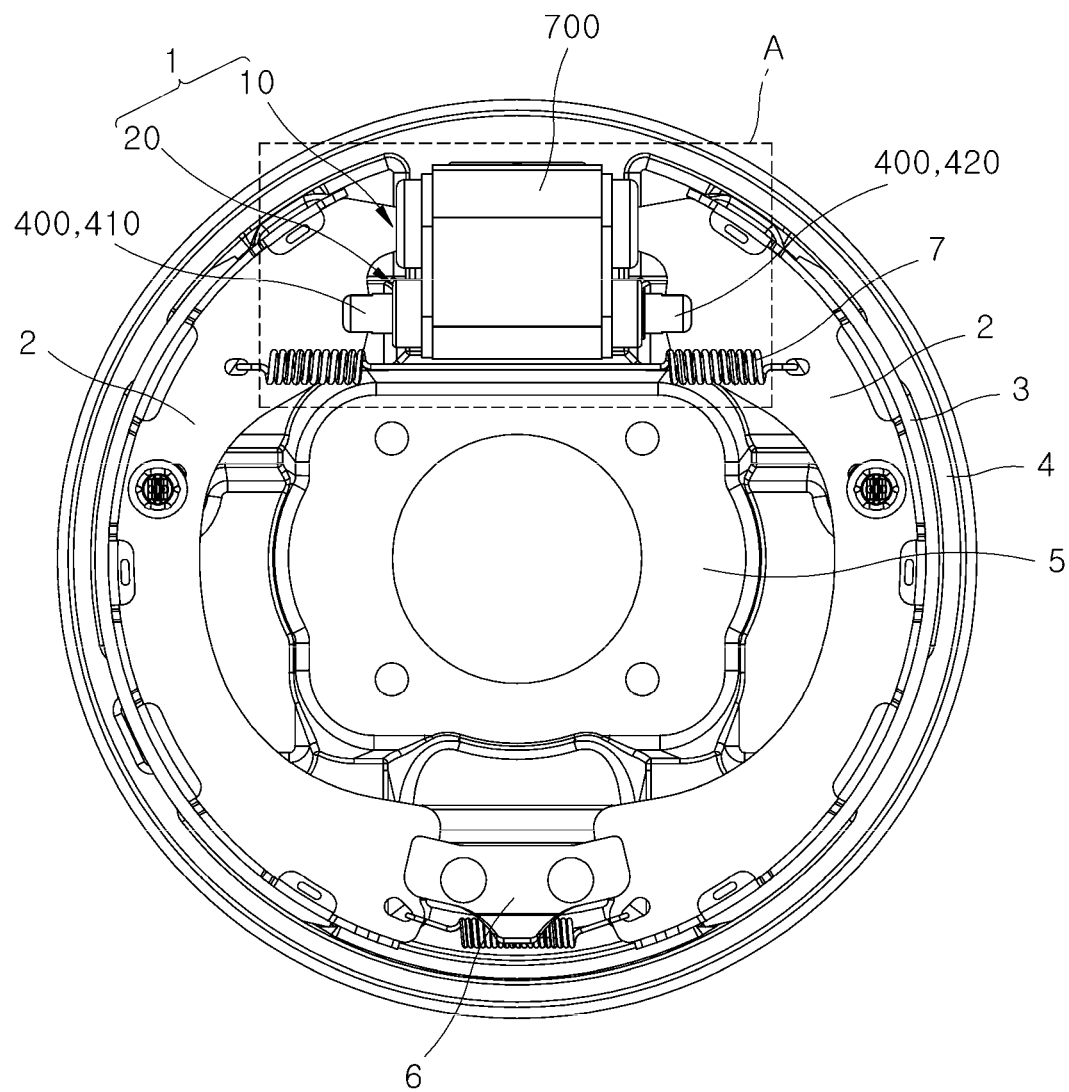
FIG. 1 is a front view schematically illustrating that an electronic parking brake device in accordance with an embodiment of the present invention is installed.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, an electronic parking brake device in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
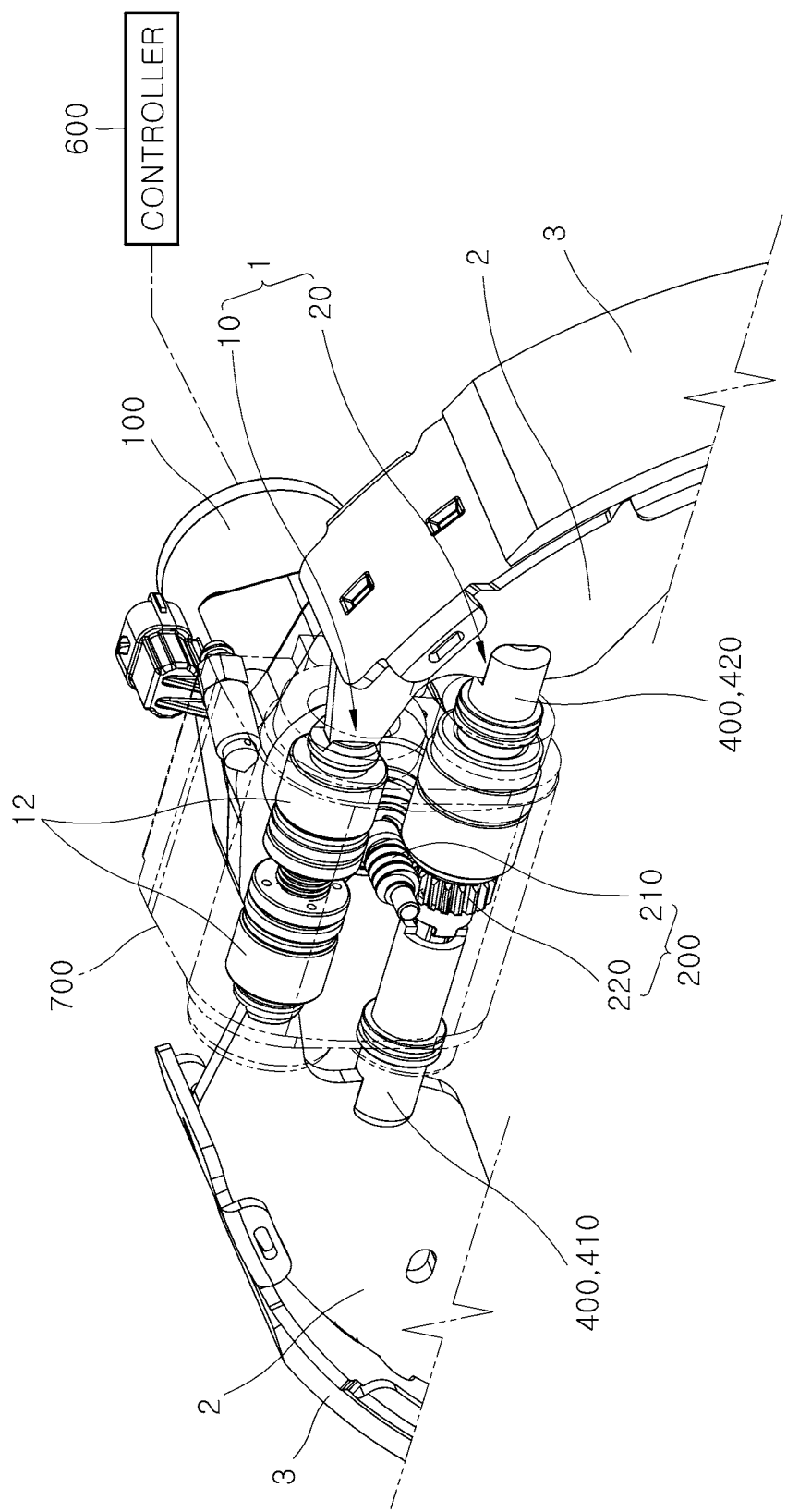
FIG. 2 is a perspective view illustrating a portion A of FIG. 1.
Figure 3:
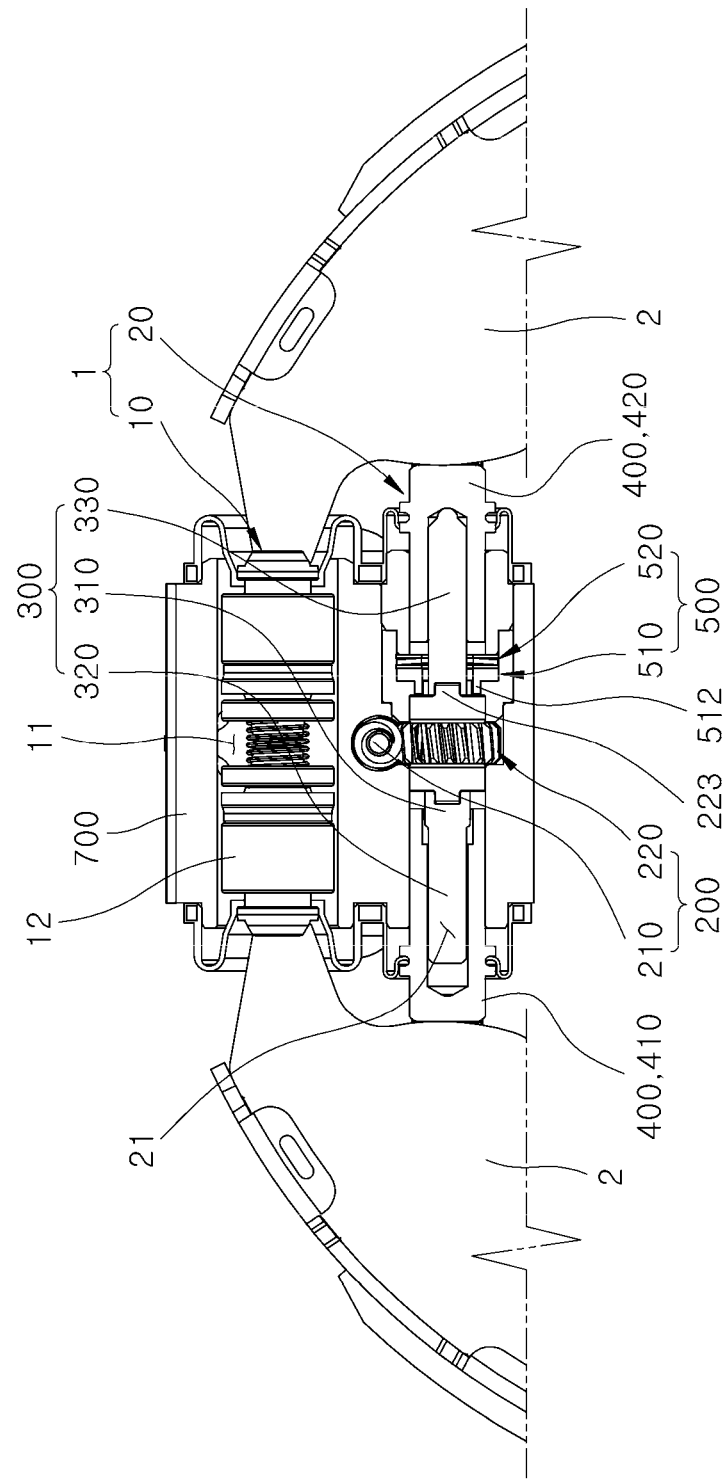
FIG. 3 is a cross-sectional view of main parts of FIG. 2.

FIG. 1 is a front view schematically illustrating that an electronic parking brake device in accordance with an embodiment of the present invention is installed, FIG. 2 is a perspective view illustrating a portion A of FIG. 1, and FIG. 3 is a cross-sectional view of main parts of FIG. 2.

Referring to FIGS. 1 to 3, the electronic parking brake device 1 in accordance with the embodiment of the present invention may include an actuator 100, a gear unit 200, a rotating rod 300, a push rod unit 400, a clutch unit 500, a controller 600 and a housing 700.

The gear unit 200 having a reduction gear structure may be connected to an output shaft of the actuator 100. The rotating rod 300 may be formed in a rod shape, and coaxially connected to the driven gear 220 of the gear unit 200. The pair of push rod unit 400 may be coupled to both ends of the rotating rod 300, and pressurize shoes 2 toward a drum 4, while being moved in an extension direction of the rotating rod 300 in connection with rotation of the rotating rod 300. When the rotating rod 300 is rotated in the forward direction, the pair of push rod units 400 may apply pressure to the shoes 2 while being moved in a direction away from each other, and when the rotating rod 300 is rotated in the reverse direction, the pair of push rod units 400 may release the pressure applied to the shoes 2 while being moved in a direction approaching each other.

The clutch unit 500 may be disposed to interfere with a moving line of the gear unit 200. When the gear unit 200 is rotated at a preset angle $\alpha°$ or more (refer to FIGS. 9A and 9B), the clutch unit 500 may apply a rotational load to the gear unit 200 while coming in contact with the gear unit 200. The rotational load may indicate a factor which hinders the gear unit 200 from smoothly rotating, and thus increases a load applied to the gear unit 200 or a current applied to the actuator 100. The controller 600 may maintain or stop the operation of the actuator 100 according to the load applied to the actuator 100.

Referring to FIGS. 2 and 3, the gear unit 200 in accordance with the embodiment of the present invention may include a driving gear 210 and a driven gear 220 which have a worm wheel gear structure. The driving gear 210 may be connected to the output shaft of the actuator 100, and have a worm gear structure. The driving gear 210 may be rotated by power received from the actuator 100. Here, a motor may be applied as the actuator 100. The driven gear 220, which serves to finally transfer the rotation of the actuator 100 to the rotating rod 300, may be designed to have a wheel gear structure so as to be engaged with the driving gear 210. The driven gear 220 may be engaged with the driving gear 210 and rotated at a constant position while the speed thereof is reduced.

Figure 4:
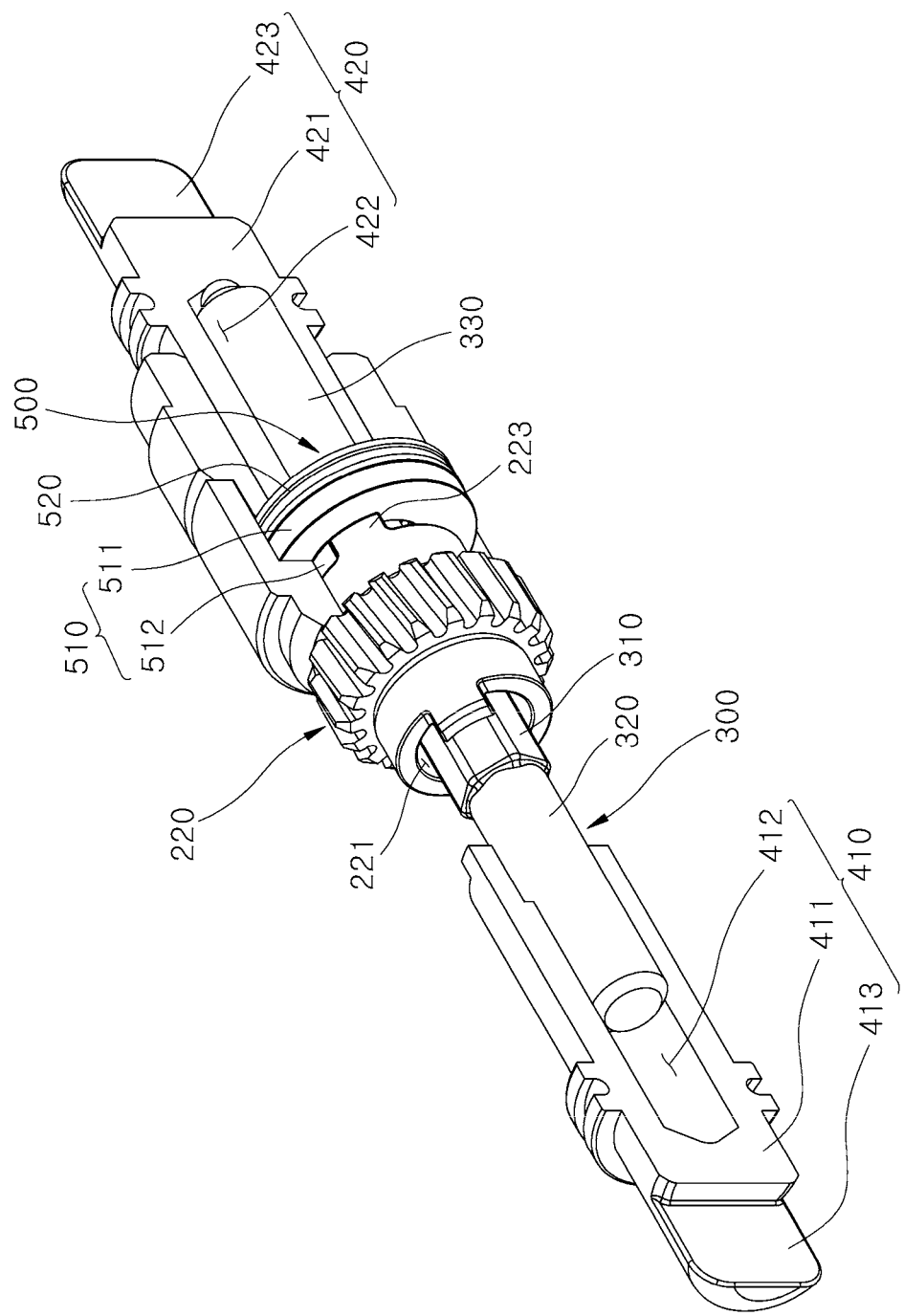
FIG. 4 is a perspective view schematically illustrating main parts of the electronic parking brake device in accordance with the embodiment of the present invention.
Figure 5:
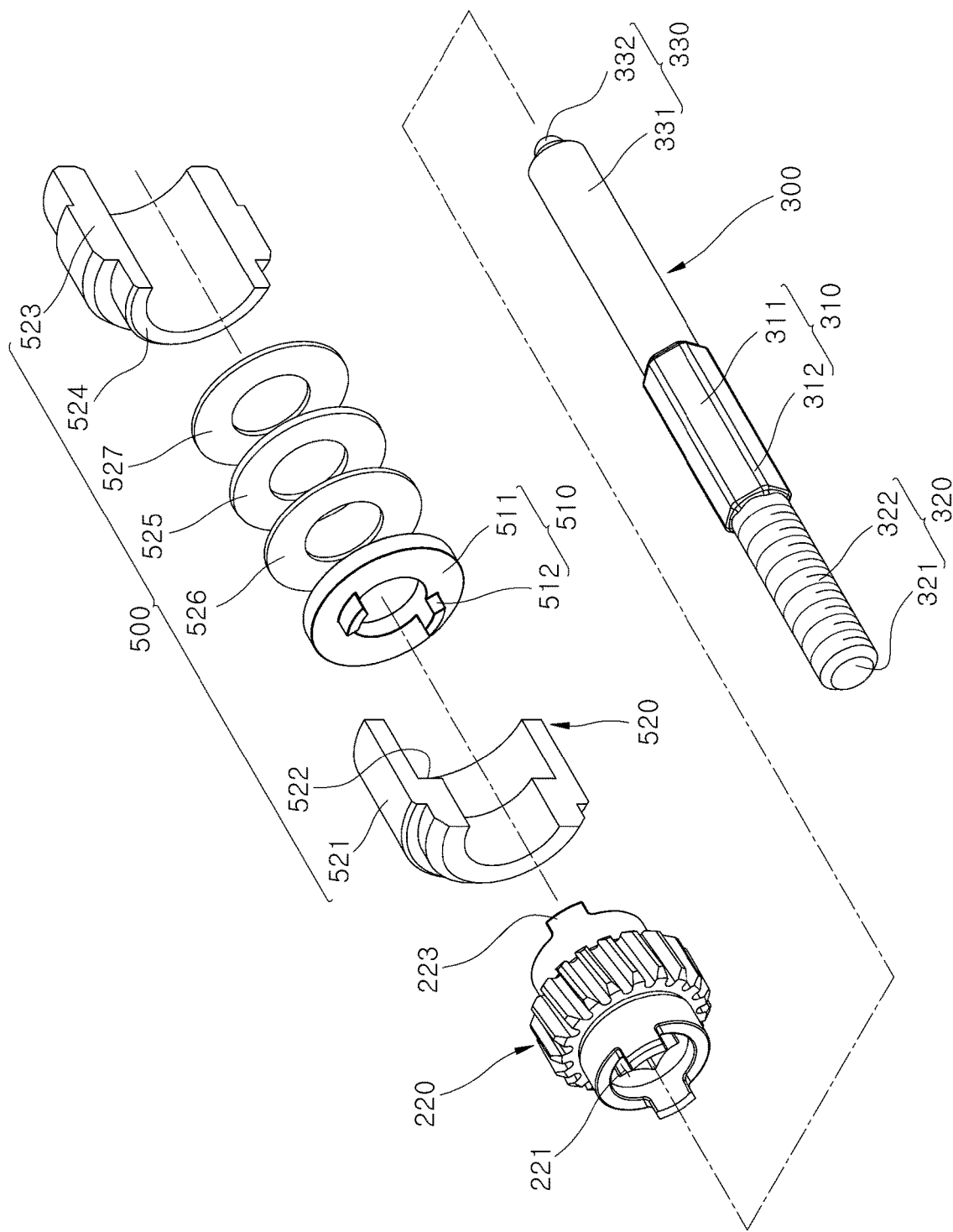
FIG. 5 is an exploded perspective view illustrating the main parts of the electronic parking brake device in accordance with the embodiment of the present invention.
Figure 6:
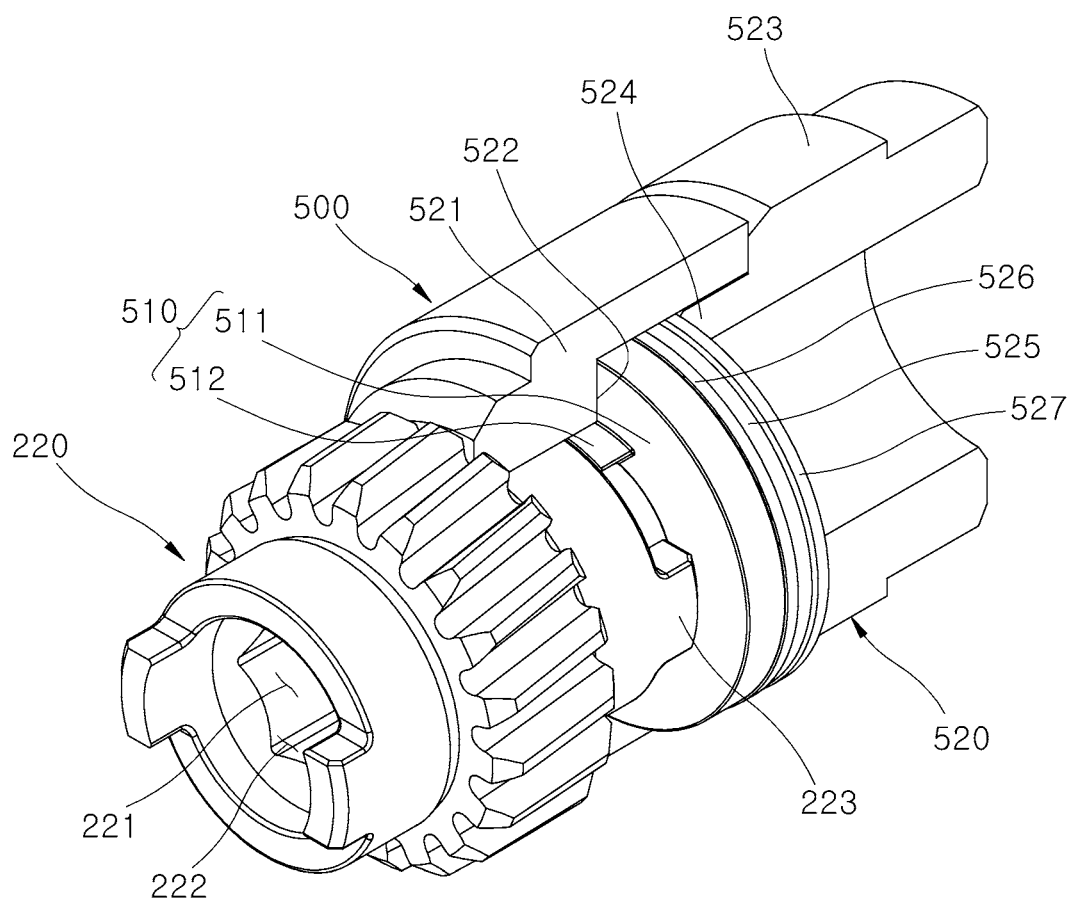
FIG. 6 is a perspective view schematically illustrating a driven gear and a clutch unit of the electronic parking brake device in accordance with the embodiment of the present invention.

FIG. 4 is a perspective view schematically illustrating the main parts of the electronic parking brake device in accordance with the embodiment of the present invention, FIG. 5 is an exploded perspective view illustrating the main parts of the electronic parking brake device in accordance with the embodiment of the present invention, and FIG. 6 is a perspective view schematically illustrating the driven gear and the clutch unit of the electronic parking brake device in accordance with the embodiment of the present invention.

Referring to FIGS. 4 to 6, the driven gear 220 in accordance with the embodiment of the present invention may a rod coupling part 221, a guide groove 222 and a clutch connection part 223.

The rod coupling part 221, to which the rotating rod 300 is fitted, may be formed through a portion corresponding to the rotation axis of the driven gear 220 along the rotation axis. The rotating rod 300 may be fitted through the rod coupling part 221 and thus assembled to the driven gear 220. The guide groove 222 may be recessed at the inner circumferential surface of the rod coupling part 221. When the guide groove 222 is formed in a recess shape, it may indicate that the rod coupling part 221 does not have a smooth circular inner circumferential surface, i.e. a circular cross-section.

That is, the guide groove 222 may serve to extend the diameter of the rod coupling part 221 based on the minimum diameter of the rod coupling part 221. One or more guide grooves 222 may be formed on the rod coupling part 221 having a circular cross-section, and the one or more guide grooves 222 and the rod coupling part 221 may form a polygonal cross-section, for example, a star-shaped cross-section. The guide groove 222 may be extended along the rotation axis of the driven gear 220 to guide straight movement of a guide protrusion 312 formed on the rotating rod 300.

The clutch connection part 223 abutting on the clutch unit 500 may be formed at one end of the driven gear 220, facing the clutch unit 500, and protrude toward the clutch unit 500. When the driven gear 220 is rotated, the clutch connection part 223 may be rotated while forming a circular moving line about the rotation axis of the driven gear 220. At one end of the clutch unit 500, facing the driven gear 220, a gear locking part 512 may be formed in a protrusion shape, and have a moving line which overlaps the clutch connection part 223. When the driven gear 220 is rotated, the clutch connection part 223 may be moved to come in contact with the gear locking part 512. Then, when the rotation direction is constantly maintained, the clutch connection part 223 and the gear locking part 512 may be moved together by the same displacement while the contact state therebetween is maintained (refer to FIGS. 9A and 9B).

Referring to FIGS. 4 and 5, the rotating rod 300 in accordance with the embodiment of the present invention may have a rod shape in which a screw extension part 320, a gear assembly part 310 and a push extension part 330 are successively connected.

The gear assembly part 310 may be installed through the rod coupling part 221 of the driven gear 220. The gear assembly part 310 in accordance with the embodiment of the present invention may include a central shaft 311 and a guide protrusion 312. The central shaft 311 having a diameter corresponding to the rod coupling part 221 may be fitted to the rod coupling part 221. The guide protrusion 312 may be formed on the outer surface of the gear assembly part 310, and inserted into the guide groove 222 so as to slide in the axial direction of the driven gear 220, i.e. the extension direction of the rotating rod 300 along the guide groove 222.

With the guide protrusion 312 constrained in the guide groove 222, the gear assembly part 310 may be moved only in the axial direction of the driven gear 220, and reliably prevented from moving or rotating in another direction. Due to the guide groove 222 and the guide protrusion 312, the driven gear 220 and the rotating rod 300 may have the same rotational displacement at all times, and the rotational force of the driven gear 220 may be stably transferred to the rotating rod 300.

The screw extension part 320 may be continuously formed at one end of the gear assembly part 310 exposed to the outside of the driven gear 220. The screw extension part 320 may be formed coaxially with the gear assembly part 310. The screw extension part 320 in accordance with the embodiment of the present invention may include a first extension 321 and a screw 322.

The first extension 321 may be formed at one end of the central shaft 311 exposed to the outside of the driven gear 220, and have a constant diameter. The screw 322 may be formed on the outer surface of the first extension 321 so as to be screwed to the push rod unit 400. By adjusting the lead of the screw 322, it is possible to adjust a straight displacement with respect to the rotational displacement of the driven gear 220. For example, suppose that the lead of the screw 322 is 4 mm. In this case, when the driven gear 220 and the rotating rod 300 are rotated once, the push rod unit 400 engaged with the screw 322, i.e. the moving push rod 410 may be straightly moved by 4 mm along the screw extension part 320. When the driven gear 220 and the rotating rod 300 are rotated by 90°, the moving push rod 410 may be moved by 1 mm.

The push extension part 330 may be continuously formed at the other end of the gear assembly part 310 exposed to the outside of the driven gear 220. The push extension part 330 may be formed in the opposite side of the screw extension part 320 so as to be coaxial with the gear assembly part 310. Thus, the screw extension part 320, the gear assembly part 310 and the push extension part 330 may form a straight-line rod shape. The push extension part 330 in accordance with the embodiment of the present invention may include a second extension 331 and a contact stabilizer 332.

The second extension 331 may be formed at the other end of the central shaft 311 exposed to the outside of the driven gear 220, and have a constant diameter. The contact stabilizer 332 having a smaller diameter than the second extension 331 may be formed at an end of the second extension 331. The contact stabilizer 332 may have a diameter that gradually decreases toward the end of the second extension 331.

When the gear assembly part 310 is slid, the entire rotating rod 300 including the gear assembly part 310 may be moved together. At this time, the push extension part 330 may transfer the sliding displacement of the gear assembly part 310 to the push rod unit 400 or specifically an interlocking push rod 420. The contact with the interlocking push rod 420 without a gap may be reliably achieved by the contact stabilizer 332. Therefore, the sliding displacement of the rotating rod 300 can be stably transferred to the interlocking push rod 420.

Referring to FIGS. 1 to 2, the push rod unit 400 in accordance with the embodiment of the present invention may include a moving push rod 410 and the interlocking push rod 420.

In FIGS. 1 and 2, the moving push rod 410 may abut on the left shoe 2 between the pair of left and right shoes 2, and be screwed to the screw extension part 320 of the rotating rod 300. Thus, when the screw extension part 320 is rotated, the moving push rod 410 may be moved along the screw extension part 320 in connection with the rotation of the screw extension part 320. Referring to FIG. 4, the moving push rod 410 in accordance with the embodiment of the present invention may include a first extended rod 411, a nut screw 412 and a first shoe connection 413.

The first extended rod 411 may be disposed between the left shoe 2 and the driven gear 220, and extended along the screw extension part 320. The nut screw 412 may be formed in a hollow shape at the right end of the first extended rod 411, and have a female screw thread formed on the inner surface thereof, the female screw thread corresponding to the screw 322. The first shoe connection 413 may be formed at the left end of the first extended rod 411, and have a slit shape to which the shoe 2 can be fitted. The first shoe connection 413 may maintain the connection with the shoe 2, and constrain movement or rotation in an arbitrary direction except the extension direction of the rotating rod 300.

In FIGS. 1 and 2, the interlocking push rod 420 may abut on the right shoe 2 between the pair of left and right shoes 2, and be connected to the push extension part 330 of the rotating rod 300. Thus, when the moving push rod 410 is moved, the interlocking push rod 420 may be pushed and moved by the push extension part 330. Such an operation will be described in more detail below. Referring to FIG. 4, the interlocking push rod 420 in accordance with the embodiment of the present invention may include a second extended rod 421, a rod cover 422 and a second shoe connection 423.

The second extended rod 421 may be disposed between the right shoe 2 and the driven gear 220, and extended along the push extension part 330. The rod cover 422 may be formed in a hollow shape at the left end of the second extended rod 421, and the push extension part 330 may be fitted to the rod cover 422. The rod cover 422 may be connected to the push extension part 330 while covering the push extension part 330. Thus, although the push extension part 330 is moved, the connection with the push extension part 330 may be maintained. The second shoe connection 423 may be formed at the right end of the second extended rod 421, and have a slit shape to which the shoe 2 can be fitted. The second shoe connection 423 may maintain the connection between the shoe 2 and the second extended rod 421, and constrain movement or rotation in an arbitrary direction except the extension direction of the rotating rod 300.

Figure 7:
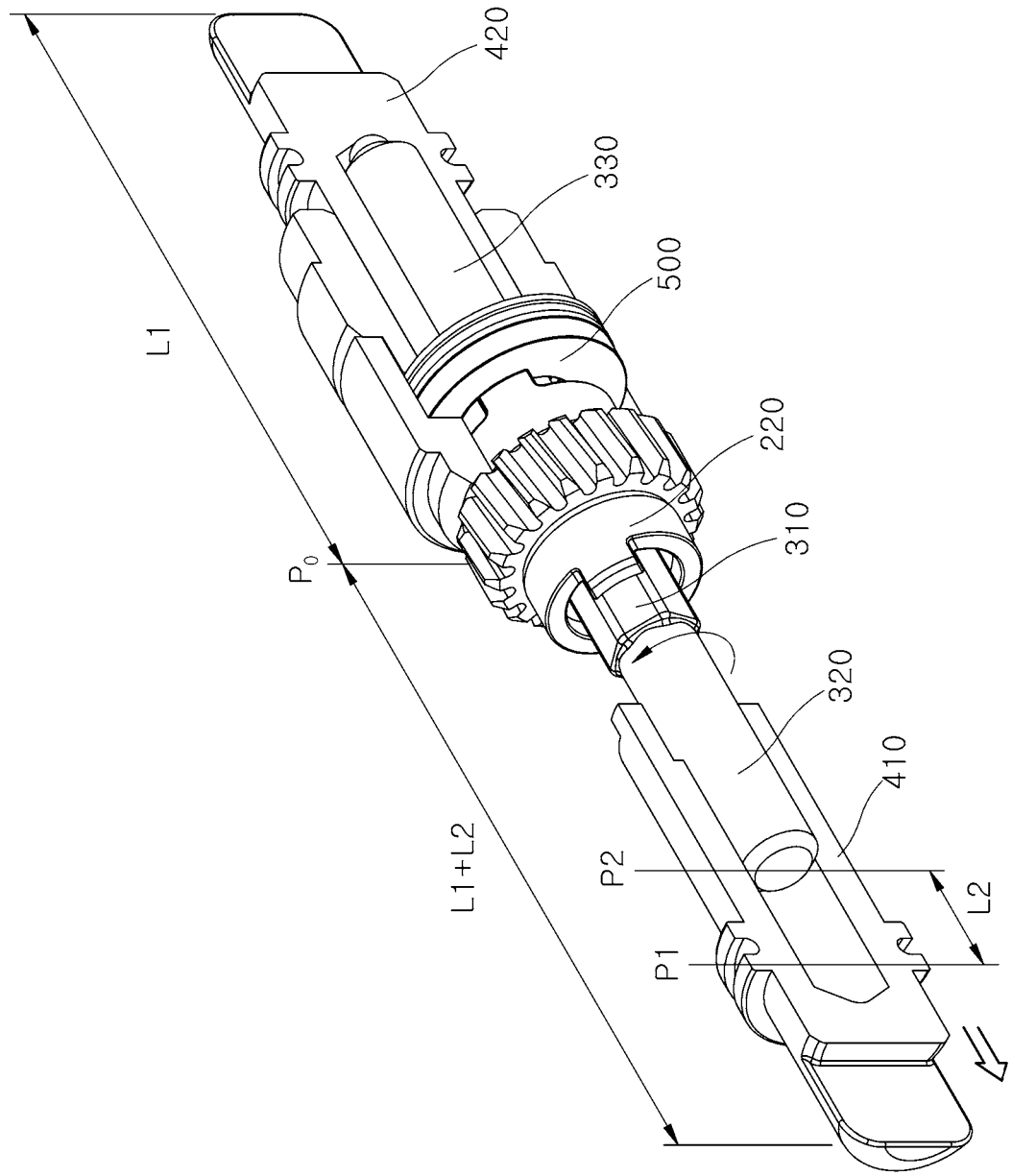
FIG. 7 is a conceptual view for describing length extension of the electronic parking brake device in accordance with the embodiment of the present invention, when the brake is operated.
Figure 8:
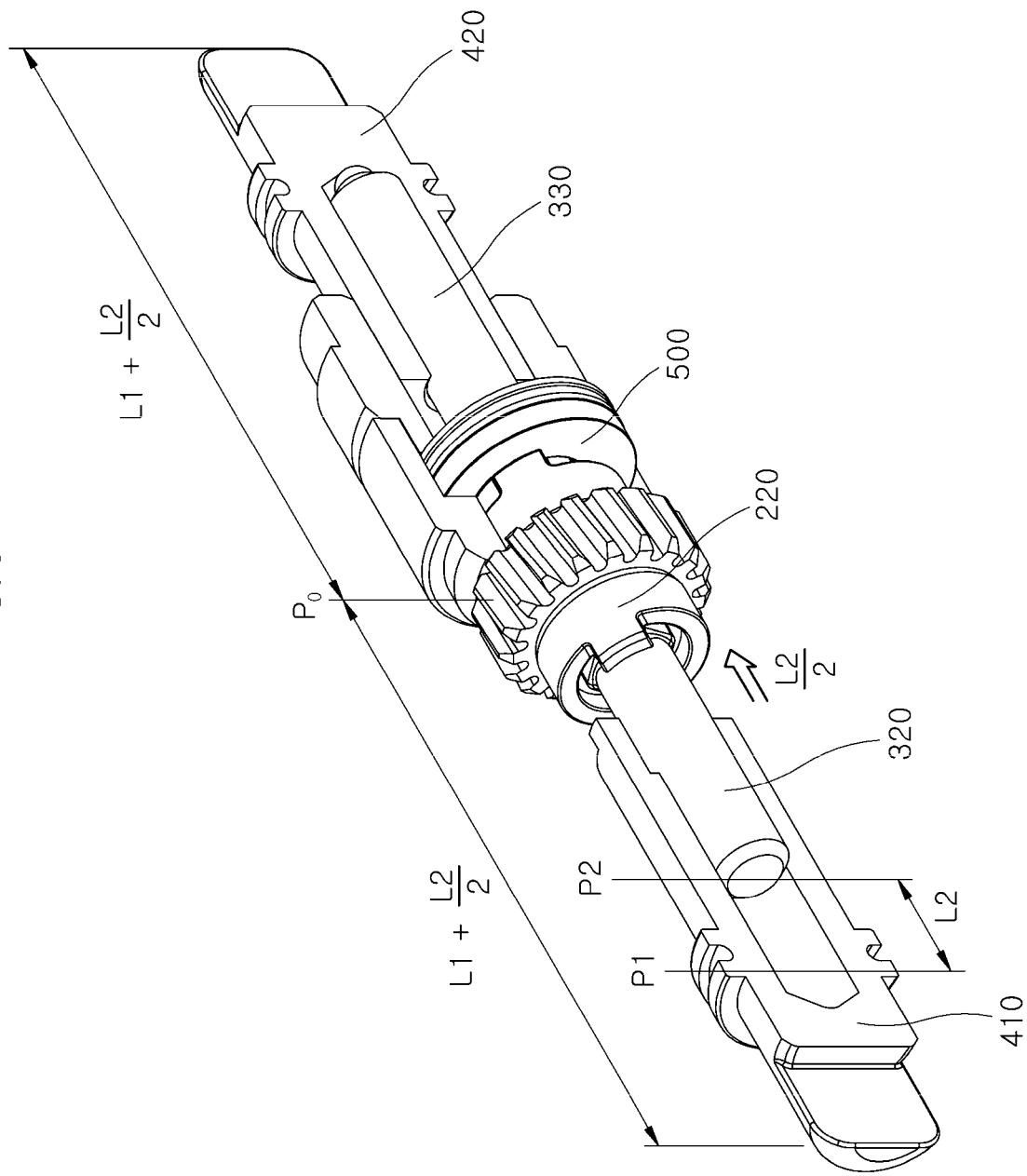
FIG. 8 is a conceptual view for describing position adjustment of the electronic parking brake device in accordance with the embodiment of the present invention, when the brake is operated.

FIG. 7 is a conceptual view for describing length extension of the electronic parking brake device in accordance with the embodiment of the present invention, when the brake is operated, and FIG. 8 is a conceptual view for describing position adjustment of the electronic parking brake device in accordance with the embodiment of the present invention, when the brake is operated.

Referring to FIG. 7, a distance from the driven gear 220 to the end of the moving push rod 410 and a distance from the driven gear 220 to the end of the interlocking push rod 420 may become L1, when the end of the screw extension part 320 is located at P1. When the brake is operated, the actuator 100 may be driven in the forward direction. At this time, the driven gear 220 may be rotated in the forward direction illustrated in FIG. 7 while interlocked with the operation of the actuator 100, and the rotating rod 300 may also be rotated by the same angular displacement as the driven gear 220.

When the rotating rod 300 is rotated in the forward direction, the moving push rod 410 may be moved by a distance corresponding to L2 toward the end of the screw extension part 320, i.e. to the left in FIG. 7, and the end of the screw extension part 320 may be located at P2. When a load caused by the contact with the shoe 2 is omitted, the distance from the driven gear 220 to the end of the moving push rod 410 may be extended to L1+L2 through such a process.

According to the state illustrated in FIG. 7, the moving push rod 410 may have a distance corresponding to L1+L2 from the driven gear 220, and the interlocking push rod 420 may have a distance corresponding to L1 from the driven gear 220. In this case, a braking force may be concentrated only on one shoe of the pair of shoes 2. In reality, as illustrated in FIGS. 1 and 2, the ends of the moving push rod 410 and the interlocking push rod 420 may be continuously constrained by the pair of shoes 2, respectively, and return springs 7 may continuously apply a pressurizing force to the pair of shoes 2 in such a direction that the ends of the pair of shoes 2 approach each other. Therefore, the moving push rod 410 and the interlocking push rod 420 may be operated as illustrated in FIG. 8.

FIG. 8 illustrates an actual case that considers a load caused by the contact with the pair of left and right shoes 2. While the moving push rod 410 is moved by L2 to the left along the screw extension part 320 as illustrated in FIG. 7, the movement to the left may be hindered by the shoe 2, such that both of the rotating rod 300 and the push rod unit 400 are naturally slid to the right by a distance corresponding to L2/2. Therefore, the moving push rod 410 and the interlocking push rod 420 may be moved outwardly to the left and right by the same displacement corresponding to L2/2 based on the driven gear 220, thereby pressurizing the pair of left and right shoes 2 with the same force.

The sliding of the rotating rod 300 may be stably performed by the rod coupling part 221 and the guide groove 222, which are formed in the driven gear 220, and the central shaft 311 and the guide protrusion 312 of the gear assembly part 310. When the brake is released, the actuator 100 may be driven in the reverse direction. At this time, while the driven gear 220 and the rotating rod 300 are rotated in the reverse direction, the moving push rod 410 and the interlocking push rod 420 may be moved by the same displacement based on the driven gear 220 through the above-described process, thereby releasing the pressure applied to the shoes 2.

Figure 11:
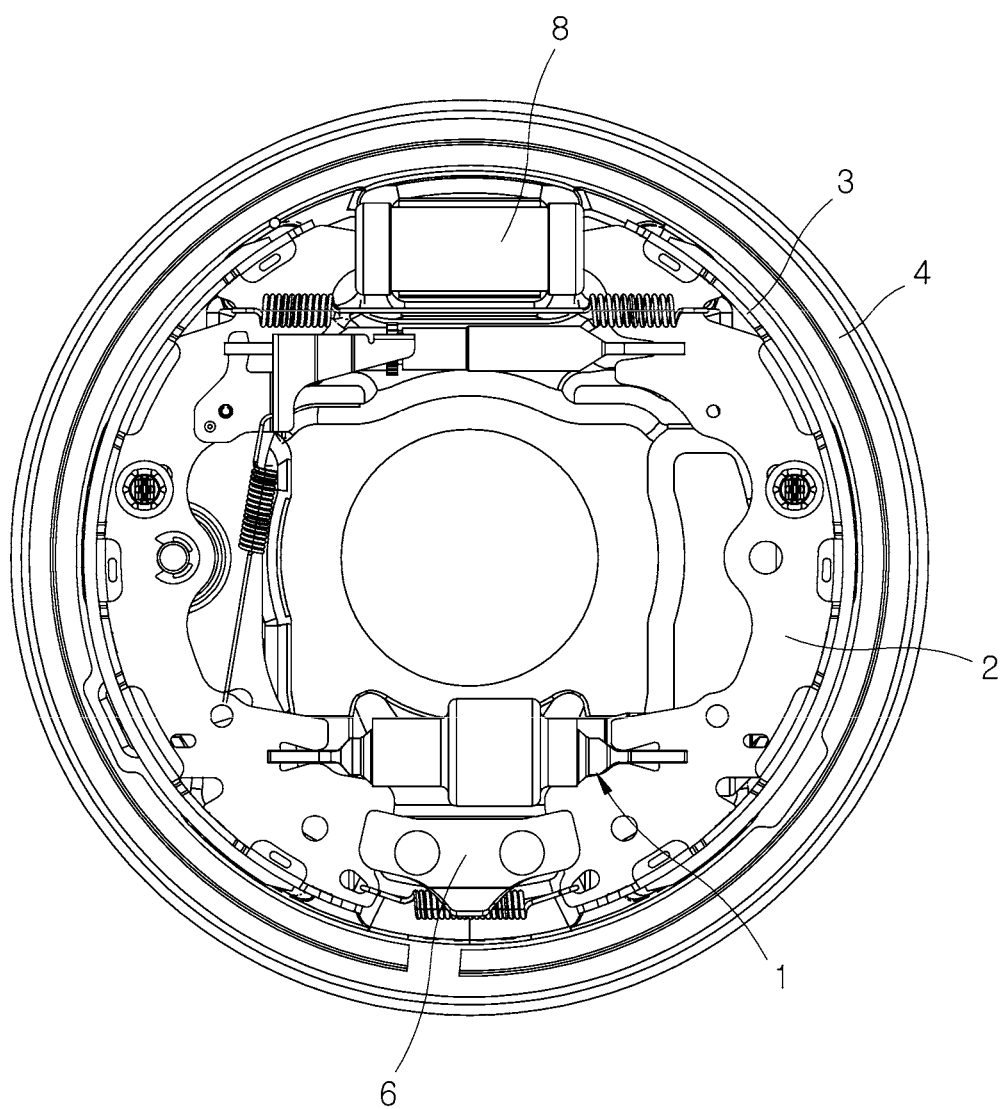
FIG. 11 is a front view schematically illustrating that an electronic parking brake device in accordance with another embodiment of the present invention is installed.

In the embodiment of the present invention, the rotating rod 300 may have the screw extension part 320 and the push extension part 330, and the push rod unit 400 may have the moving push rod 410 and the interlocking push rod 420. However, the rotating rod 300 and the push rod unit 400 are not limited thereto, as long as an adjust function can be implemented through the clutch unit 500. For example, as illustrated in FIG. 11, the present invention may be embodied in a different manner such that the rotating rod 300 has a pair of screw extension parts 320 without the push extension part 330 and the push rod unit 400 has a pair of moving push rods 410 without the interlocking push rod 420.

Referring to FIGS. 4 to 6, the clutch unit 500 in accordance with the embodiment of the present invention may include a clutch ring 510 and a rotational load element 520.

The clutch ring 510 may serve to transfer a load to the driven gear while coming in contact with the driven gear 220, and include a clutch base part 511 and the gear locking part 512. The clutch base part 511 having a flat ring shape may be fitted to the circumference of the rotating rod 300, and thus disposed coaxially with the driven gear 220. The gear locking part 512 may be formed on the clutch base part 511 so as to protrude toward the driven gear 220, and disposed at a preset angle $\alpha°$ with the clutch connection part 223 of the driven gear 220 (refer to FIGS. 9A and 9B).

The rotational load element 520 may serve to pressurize the clutch ring 510 to hinder smooth rotation of the clutch ring 510, and include a first clutch casing 521, a second clutch casing 523, an elastic pressurizing member 525, a first plate 526 and a second plate 527.

The first and second clutch casings 521 and 523 may serve to constrain the clutch ring 510, the elastic pressurizing member 525, the first plate 526 and the second plate 527 at correct positions. The first and second clutch casings 521 and 523 may be disposed on the circumferences of the driven gear 220, the push rod unit 400 and the rotating rod 300 while covering the clutch ring 510, the elastic pressurizing member 525, the first plate 526 and the second plate 527.

The first clutch casing 521 may be coupled to the circumference of the driven gear 220, and the clutch ring 510, the elastic pressurizing member 525, the first plate 526 and the second plate 527 may be housed in the first clutch casing 521. The first clutch casing 521 may have a first contact part 522 formed at the contact with the clutch base part 511. The second clutch casing 523 may be coupled to the circumference of the push rod unit 400, and connected to the first clutch casing 521 while an end portion thereof is fitted into the first clutch casing 521. The end portion fitted into the first clutch casing 521 may face the first contact part 522, and abut on the elastic pressurizing member 525 or the second plate 527.

The elastic pressurizing member 525 may serve to elastically pressurize the clutch base part 511, and be disposed between the clutch base part 511 and a second contact part 524. As the elastic force of the elastic pressurizing member 525 is increased, a rotational load applied to the clutch ring 510 may increase. At this time, a disk spring may be applied as the elastic pressurizing member 525, and the number of the elastic pressurizing members 525 or the material or bending degree of the elastic pressurizing member 525 may be varied depending on the magnitude of a load to be applied.

The first plate 526 having a flat ring shape may be disposed between the clutch ring 510 and the elastic pressurizing member 525. The elastic force of the elastic pressurizing member 525 may be evenly distributed by the first plate 526 and transferred to the clutch ring 510. The second plate 527 having a flat ring shape may be disposed between the elastic pressurizing member 525 and the second contact part 524. The elastic force of the elastic pressurizing member 525 may be evenly distributed by the second plate 527 and transferred to the second clutch casing 523. The second plate 527 may prevent an uneven contact between the elastic pressurizing member 525 and the second clutch casing 523, thereby uniformly creating a target magnitude of load without highs and lows.

When the clutch ring 510 is rotated, the clutch base part 511 may be rotated while both surfaces thereof come in contact with the first contact part 522 and the first plate 526. Therefore, when the clutch ring 510 is rotated, a load corresponding to a friction force with the first contact part 522 and the first plate 526 may be applied to the clutch base part 511. When the driven gear 220 is intended to continuously rotate with the clutch connection part 223 brought in contact with the gear locking part 512 or when the clutch ring 510 is pulled, such a load may be transferred even to the driven gear 220.

Figure 9A:
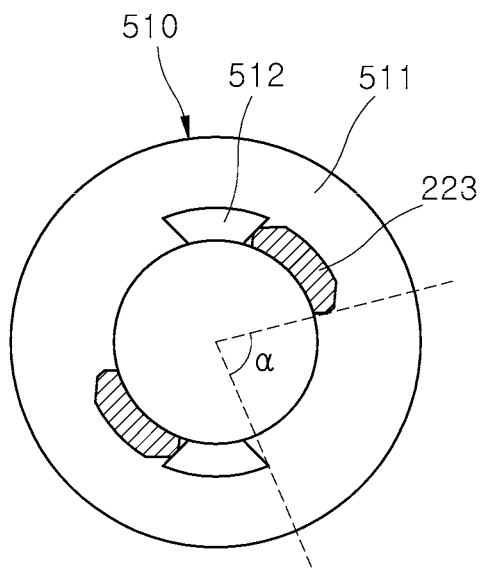
FIGS. 9A and 9B are a conceptual view for describing a process in which a load of the clutch unit is transferred to the driven gear of the electronic parking brake device in accordance with the embodiment of the present invention, when the brake is released.
Figure 9B:
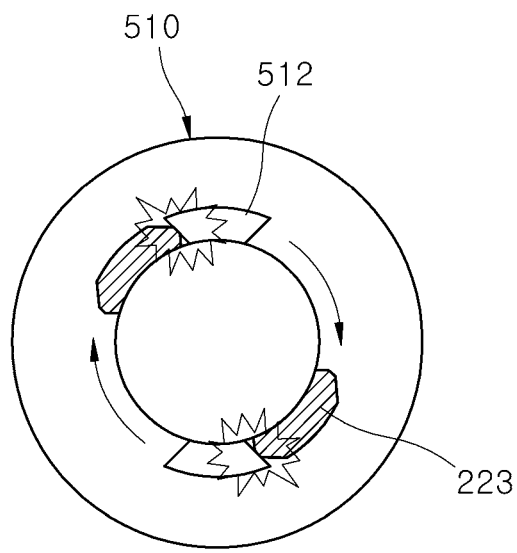
Figure 10:
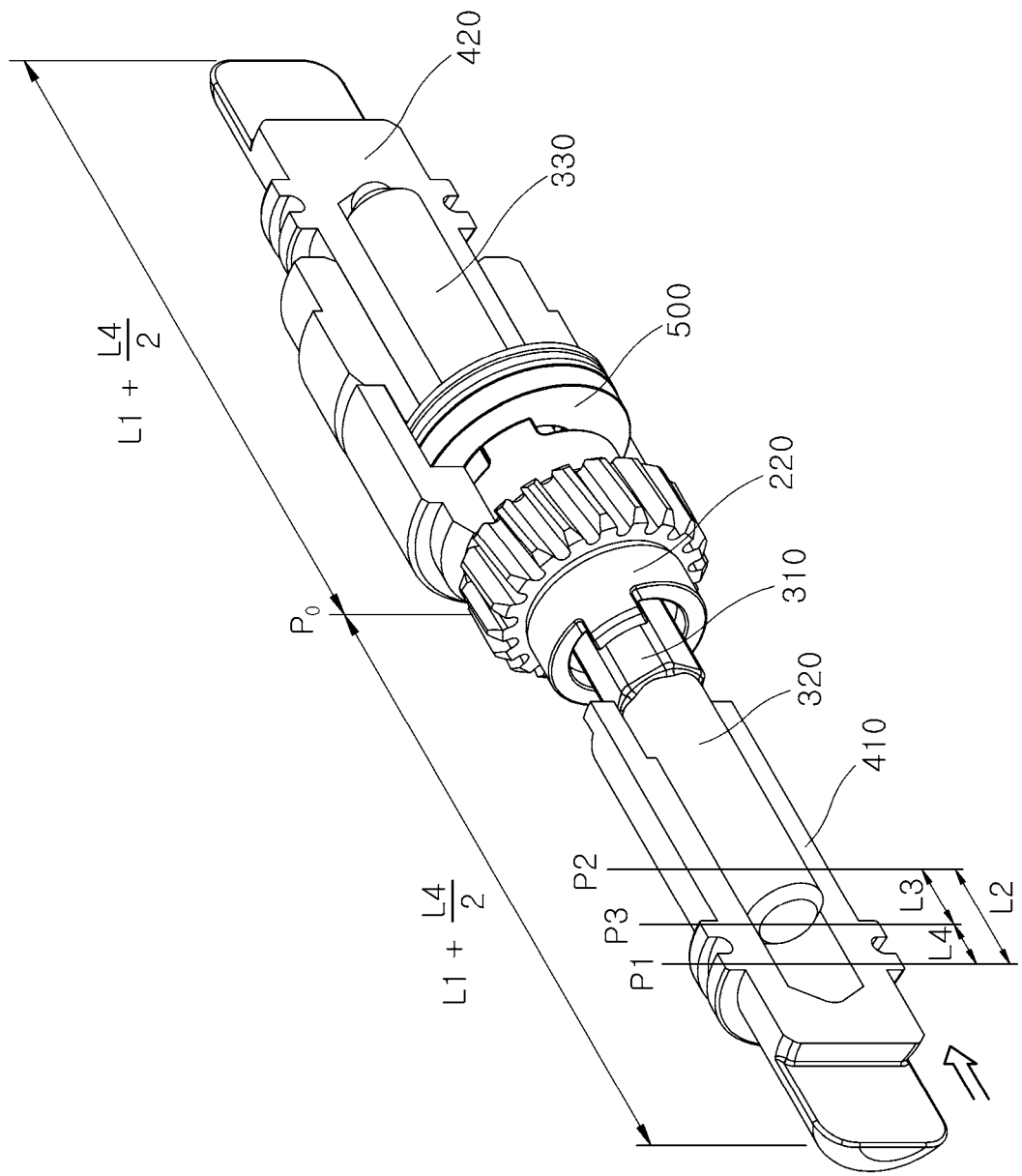
FIG. 10 is a conceptual view for describing an adjust gap by the electronic parking brake device in accordance with the embodiment of the present invention, when the brake is released.

FIGS. 9A and 9B are a conceptual view for describing a process in which a load of the clutch unit is transferred to the driven gear of the electronic parking brake device in accordance with the embodiment of the present invention, when the brake is released, and FIG. 10 is a conceptual view for describing an adjust gap of the electronic parking brake device in accordance with the embodiment of the present invention, when the brake is released.

Referring to FIGS. 9A and 9B, the clutch connection part 223 and the gear locking part 512 may be disposed with the preset angle α° therebetween. When the driven gear 220 is rotated by the preset angle α° in a state illustrated in FIG. 9A, the clutch connection part 223 may abut on the gear locking part 512 as illustrated in FIG. 9B. In this state, when the driven gear 220 is continuously rotated, a load of the clutch ring 510 may be transferred and applied even to the driven gear 220. Furthermore, the load may also be transferred and applied to the actuator 100 which drives the driven gear 220, and thus raise the current applied to the actuator 100.

The current rise may appear in various manners depending on the specification of the device or the intensity of the load. For example, the current may be varied from a state in which no load is applied to a state in which a load is applied, rapidly raised, gradually raised after the clutch connection part 223 and the gear locking part 512 abut on each other, or constantly maintained after slightly raised. Therefore, the standard of the current raise may be properly set depending on a product to which the present invention is applied.

The controller 600 may driven the actuator 100 in the forward direction when the parking brake is operated, and stop the operation of the actuator 100 when a preset magnitude of current is applied to the actuator 100 while the shoe 2 pressurizes the drum 4. The current applied to the actuator 100 may be raised in proportion to the pressurizing force of pressurizing the shoe 2. Thus, through the operation of the controller 600, parking braking may be performed. Specifically, the actuator 100 may be driven in the forward direction to pressurize the shoes 2 toward the drum 4 with the preset force, and the operation of the actuator 100 in the forward direction may be stopped to maintain the pressurized state. At this time, the driven gear 220, the rotating rod 300 and the push rod unit 400 may be operated as illustrated in FIG. 8.

When the parking brake is operated, the driven gear 220 may be continuously rotated in the forward direction (the counterclockwise direction in FIG. 9A), with the clutch connection part 223 and the gear locking part 512 abutting on each other as illustrated in FIG. 9A, that is, with the load increased by the clutch unit 500. At this time, the load caused by the clutch unit 500 may be lower than the load caused by pressuring the shoes 2 with the preset force, and not serve as a hindering factor when a braking force is applied to the shoes 2.

Referring to FIG. 7, when the parking brake is operated, the shoe 2 may be brought in contact with the drum 4 while the distance between the moving push rod 410 and the interlocking push rod 420 is increased by L2. For example, when the driven gear 220 and the rotating rod 300 are rotated once under the supposition that the lead of the screw 322 is 4 mm, the moving push rod 410 may be moved straight by 4 mm along the screw extension part 320. When the driven gear 220 and the rotating rod 300 are rotated once until the shoe 2 is brought in contact with the drum 4 by a preset pressurizing force, the extension distance L2 between the moving push rod 410 and the interlocking push rod 420 may become 4 mm.

The controller 600 may drive the actuator 100 in the reverse direction when the parking brake is released, and stop the operation of the actuator 100 when the current applied to the actuator 100 rises while the load is applied to the gear unit 200 by the clutch unit 500. As the controller 600 performs such control when the brake is released, the gap between the shoe 2 and the drum 4 may be constantly maintained at a distance corresponding to the relative angle α° between the clutch connection part 223 and the gear locking part 512.

When the parking brake is operated, the driven gear 220 may be rotated in the forward direction, and the clutch connection part 223 and the gear locking part 512, which abut on each other as illustrated in FIG. 9A, may be continuously rotated in the forward direction (the counterclockwise direction in FIG. 9A) and then stopped. Therefore, before the parking brake is released, the clutch connection part 223 may maintain the contact with the gear locking part 512 on the clockwise side of the gear locking part 512 as illustrated in FIG. 9A.

Therefore, the release of the parking brake may be always started in the state illustrated in FIG. 9A. The clutch connection part 223 and the gear locking part 512 may be disposed with the preset angle α° therebetween. Thus, when the driven gear 220 is rotated by the preset angle α° in the reverse direction (the clockwise direction in FIG. 9A) in the case that the parking brake is released, the clutch connection part 223 of the driven gear 220 may abut on the gear locking part 512 as illustrated in FIG. 9B. At this time, while the load of the clutch unit 500 is transferred to the actuator 100 through the driven gear 220 and the driving gear 210, the current applied to the actuator 100 may rise, and the controller 600 may recognize the rise of the current and stop the operation of the actuator 100 in the reverse direction.

After the rotation of the driven gear 220 in the reverse direction is started, no load may be applied to the driven gear 220 until the clutch connection part 223 collides with the gear locking part 512. That is, the no-load state may be achieved. Then, when the clutch connection part 223 abuts on the gear locking part 512, a load may be applied to the driven gear 220. Such a load variation may appear as a current variation of the actuator 100.

When the driven gear 220 is rotated by the preset angle $\alpha°$ in the reverse direction as described above, the moving push rod 410 may be returned by L3 along the screw extension part 320 as illustrated in FIG. 10, and the end of the screw extension part 320 on the moving push rod 410 may be moved from P2 to P3. That is, the reverse rotation of the driven gear 220 by the preset angle $\alpha°$ may indicate the return of the moving push rod 410 by L3. For example, when the driven gear 220 and the rotating rod 300 are rotated by 90° under the supposition that the lead of the screw 322 is 4 mm and the preset angle $\alpha°$ is 90°, the moving push rod 410 may be moved by 1 mm, and a gap of 0.5 mm may be provided between the left shoe 2 and the drum 4 and between the right shoe 2 and the drum 4.

Therefore, the shoe 2 and the drum 4 may constantly maintain a gap corresponding to 0.5 mm whenever the parking brake is released. More specifically, a gap between the drum 4 and the friction material 3 coupled to the shoe 2 may be constantly maintained. Referring to FIG. 10, when the final moving distance of the moving push rod 410 is L2 and the returning distance of the moving push rod 410 is L3, it may indicate that the friction material 3 is worn by L4. That is, the wear of the friction material 3, corresponding to L4, may be compensated for.

In accordance with the embodiment of the present invention, when the parking brake is operated, the actuator 100 may be controlled to stop in the case that the preset magnitude of current is applied to the actuator 100 driven in the forward direction, and when the parking brake is released, the actuator 100 may be controlled to stop in the case that the current applied to the actuator 100 driven in the reverse direction is raised. Therefore, the gap between the shoe 2 and the drum 4 may be constantly maintained as a distance corresponding to the relative angle $\alpha°$ between the clutch connection part 223 and the gear locking part 512.

The electronic parking brake device 1 having the above-described configuration in accordance with the embodiment of the present invention may have a structure in which a main braking unit 10 and a parking braking unit 20 are formed in one housing 700 as illustrated in FIG. 1.

The main braking unit 10 may include a piston housing part 11 formed in the housing 700 and a piston 12 installed in the piston housing part 11, and perform main braking using hydraulic pressure. Furthermore, the parking braking unit 20 may include a rod housing part 21 formed in the housing 700 and the gear unit 200, the rotating rod 300, the push rod unit 400 and the clutch unit 500, which are installed in the rod housing part 21, and perform parking braking. According to such a configuration, both of the main braking function and the parking braking function may be implemented by only installing one electronic parking brake device 1 between free ends of the pair of shoe 2.

However, the present invention is not limited thereto, as long as the adjust function can be implemented through the clutch unit 500. For example, the electronic parking brake device in accordance with the embodiment of the present invention may have a structure including the gear unit 200, the rotating rod 300, the push rod unit 400, the clutch unit 500 and the controller 600, and may be manufactured and installed separately from a wheel cylinder 8.

FIG. 11 is a front view illustrating that an electronic parking brake device in accordance with another embodiment of the present invention is installed.

The electronic parking brake device in accordance with the embodiment of the present invention may be manufactured separately from the wheel cylinder 8, and disposed in parallel to the wheel cylinder 8 between the free ends of the pair of shoes 2, or installed at an anchor 6 corresponding to fixed ends of the shoes 2 as illustrated in FIG. 11. Furthermore, the electronic parking brake device may be installed outside the drum 4 or on the opposite side of the back plate 5. That is, the installation position of the electronic parking brake device may not be specifically limited (refer to FIG. 1).

In accordance with the embodiment of the present invention, when the parking brake is released, a load may be applied to the clutch unit 500 by the gear unit 200 rotated by the preset angle $\alpha°$, and the controller 600 may control the operation of the actuator 100 according to the load, such that the gap between the shoe 2 and the drum 4 is constantly maintained as a distance corresponding to the preset angle $\alpha°$. That is, the adjust function can be implemented.

Furthermore, the electronic parking brake device 1 in accordance with the embodiment of the present invention may be manufactured with a simple structure in which the gear unit 200, the rotating rod 300, the push rod unit 400 and the clutch unit 500 are coaxially connected and fastened to one housing 700. Therefore, the electronic parking brake device 1 does not need to include a plurality of parts such as an adjuster, a lever pawl and a tensile spring, the adjuster including a male push rod, a female push rod and an adjustment nut, unlike an existing device. Furthermore, the electronic parking brake device 1 can omit an inconvenient process of assembling the parts to preset positions in order to implement the adjust function in connection with moving line changes of the shoes and the operating lever for the parking brake.

Furthermore, since the gap between the shoe 2 and the drum 4 is correctly maintained as a distance corresponding to the preset angle $\alpha°$, the extension of the gap with the drum 4 may be linearly compensated for according to the wear of the friction material 3, which makes it possible to prevent degradation in adjustment precision, which occurs as the gap compensation is performed on a gear basis in the existing device.

Furthermore, the electronic parking brake device 1 in accordance with the embodiment of the present invention may not only compensated for the extension of the gap with the drum 4 due to the wear of the friction material 3, but also flexibly compensate for the reduction of the gap with the drum 4, which makes it possible to solve the problem of the existing device that could not efficiently cope with thermal expansion of the drum 4 because the existing device could not implement an operation of reducing the length of the adjuster.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An electronic parking brake device comprising:
a gear unit including a driving gear and a driven gear;
an actuator configured to drive the gear unit;
a rotating rod configured to be rotated by the gear unit;
a push rod unit configured to pressurize one or more shoes while moved in connection with the rotating rod;
a clutch unit coaxially connected to the driven gear of the gear unit, and configured to apply a rotational load to the gear unit while abutting the gear unit in response to the gear unit being rotated at a preset angle; and
a controller configured to control an operation of the actuator according to a load applied to the actuator.

2. The electronic parking brake device of claim 1, wherein the actuator is configured to rotate the driving gear, and wherein the driven gear is engaged with the driving gear and rotated while a speed of the driving gear is reduced.

3. The electronic parking brake device of claim 2, wherein the driven gear comprises:
a rod coupling part to which the rotating rod is fitted;
a guide groove formed on an inner circumferential surface of the rod coupling part, and extended in a direction of a rotation axis; and
a clutch connection part abutting the clutch unit.

4. The electronic parking brake device of claim 3, wherein the rotating rod comprises:
a gear assembly part installed through the rod coupling part; and
a screw extension part formed coaxially with the gear assembly part, and comprises a screw coupled to the push rod unit.

5. The electronic parking brake device of claim 4, wherein the gear assembly part comprises:
a central shaft having a diameter corresponding to the rod coupling part; and
a guide protrusion formed on an outer surface of the gear assembly part, and slid along the guide groove in an axial direction of the driven gear.

6. The electronic parking brake device of claim 5, wherein the screw extension part comprises:
a first extension formed at one end of the central shaft, and having the screw formed on an outer surface of the first extension, the screw being coupled to the push rod unit; and
a second extension formed at the other end of the central shaft, and having a contact stabilizer formed at an end of the second extension.

7. The electronic parking brake device of claim 4, wherein the rotating rod further comprises a push extension part connected to the gear assembly part on an opposite side of the screw extension part, and configured to transfer a sliding displacement of the gear assembly part to the push rod unit.

8. The electronic parking brake device of claim 7, wherein the push rod unit comprises:
a moving push rod abutting one shoe of a pair of the one or more shoes, screwed to the screw extension part, and moved along the screw extension part while interlocking with rotation of the screw extension part; and
an interlocking push rod abutting another shoe of the pair of the one or more shoes, connected to the push extension part, and pushed and moved by the push extension part in response to the moving push rod being moved.

9. The electronic parking brake device of claim 3, wherein the clutch unit comprises:
a clutch base part disposed coaxially with the driven gear;
a gear locking part formed in a protrusion shape on the clutch base part, and disposed at the preset angle with the clutch connection part; and
a rotational load element configured to pressurize the clutch base part such that a load is applied to the driven gear while the clutch connection part is locked to the gear locking part.

10. The electronic parking brake device of claim 9, wherein the rotational load element comprises:
a first contact part disposed on one side of the clutch base part, and abutting the clutch base part;
a second contact part facing the first contact part, with the clutch base part provided therebetween; and
an elastic pressurizing member disposed between the clutch base part and the second contact part, and elastically pressurizing the clutch base part.

11. The electronic parking brake device of claim 2, wherein the controller is configured to:
drive the actuator in a forward direction in response to the electronic parking brake device being operated; and
stop the operation of the actuator in response to a preset magnitude of current being applied to the actuator to apply pressure to a shoe of the one or more shoes to pressurize a drum.

12. The electronic parking brake device of claim 11, wherein the controller is configured to:
release the electronic parking brake device;
recognize an increase in a current applied to the actuator in response to the load of the clutch unit transferred to the actuator in response to the driven gear rotated by the preset angle in a reverse direction in response to the electronic parking brake device being released; and
drive the actuator to stop the actuator from rotating in the reverse direction in response to recognizing the increase in the current applied to the actuator.

13. An hybrid electronic parking brake device comprising:
a main hydraulic braking unit comprising:
a piston housing; and
a piston disposed in the piston housing, the piston configured to adjust pressure applied to one or more shoes;
a parking braking unit comprising:
a push rod configured to adjust pressure applied to one or more shoes;
a rotating rod configured to move the push rod to adjust pressure applied to the one or more shoes; and
a gear unit configured to rotate the rotating rod to move the rotating rod, the gear unit comprising a driving gear and a driven gear;
a housing enclosing the main hydraulic braking unit and the parking braking unit and
a clutch unit coaxially connected to the driven gear of the gear unit, the rotating rod, and the push rod, the clutch unit being configured to apply a rotational load to the gear unit in response to the gear unit being rotated at a preset angle.

14. The hybrid electronic parking brake device of claim 13, further comprising:
an actuator configured to drive the gear unit by rotating the driving gear; and a controller configured to control an operation of the actuator to adjust a load applied to the actuator.

15. The hybrid electronic parking brake device of claim 14, wherein the driven gear comprises a clutch connection part protruding toward the clutch unit, and wherein the clutch unit comprises:
 a clutch base disposed coaxially with the driven gear;
 a gear locking part protruding from the clutch base, the gear locking part disposed at a preset rotational angle with respect to the clutch connection part.

16. The hybrid electronic parking brake device of claim 15, wherein the controller is configured to operate the hybrid electronic parking brake device by:
 driving the actuator in a forward direction; and
 stopping the operation of the actuator in response to a preset magnitude of current being applied to the actuator to apply pressure to a shoe of the one or more shoes to pressurize a drum.

17. The hybrid electronic parking brake device of claim 15, wherein the controller is configured to release the hybrid electronic parking brake device by:
 driving the actuator in a reverse direction;
 recognizing an increase in a current applied to the actuator in response to the load of the clutch unit transferred to the actuator in response to the driven gear rotated by the preset angle in a reverse direction in response to the hybrid electronic parking brake device being released; and
 drive the actuator to stop the actuator from rotating in the reverse direction in response to recognizing the increase in the current applied to the actuator.

18. The hybrid electronic parking brake device of claim 13, further comprising a drum, wherein the main hydraulic braking unit and the parking braking unit are configured to apply pressure to the one or more shoes toward the drum to operate the hybrid electronic parking brake device.

19. The hybrid electronic parking brake device of claim 13, wherein the one or more shoes comprise a pair of shoes, and
 wherein the main hydraulic braking unit and the parking braking unit enclosed in the housing are disposed between free ends of the pair of shoes.

* * * * *